United States Patent
Holleschau et al.

(10) Patent No.: US 10,588,187 B2
(45) Date of Patent: Mar. 10, 2020

(54) LED DRIVER ADAPTED FOR GANG BOXES

(71) Applicant: Elemental LED, Inc., Reno, NV (US)

(72) Inventors: Randall Holleschau, Reno, NV (US);
Russell Petersen, Alameda, CA (US);
Wesley Buck, Albany, CA (US)

(73) Assignee: Elemental LED, Inc., Reno, NV (US)

( * ) Notice: Subject to any disclaimer, the term of this patent is extended or adjusted under 35 U.S.C. 154(b) by 0 days.

(21) Appl. No.: 16/422,389

(22) Filed: May 24, 2019

(65) Prior Publication Data
US 2019/0281674 A1 Sep. 12, 2019

Related U.S. Application Data

(60) Continuation of application No. 15/693,980, filed on Sep. 1, 2017, now Pat. No. 10,349,476, which is a division of application No. 15/360,915, filed on Nov. 23, 2016, now Pat. No. 9,788,374.

(60) Provisional application No. 62/411,166, filed on Oct. 21, 2016, provisional application No. 62/344,219, filed on Jun. 1, 2016.

(51) Int. Cl.
*H05B 33/08* (2020.01)
*F21S 8/06* (2006.01)
*H02G 3/08* (2006.01)
*F21V 23/02* (2006.01)

(52) U.S. Cl.
CPC .......... *H05B 33/0815* (2013.01); *F21S 8/061* (2013.01); *H02G 3/08* (2013.01); *H05B 33/0845* (2013.01); *F21V 23/023* (2013.01)

(58) Field of Classification Search
CPC .. H05B 33/0815; H05B 33/0845; H02G 3/08; F21S 8/061; F21V 23/023

USPC ...................................................... 315/200 R
See application file for complete search history.

(56) References Cited

U.S. PATENT DOCUMENTS

| | | |
|---|---|---|
| 3,690,501 A | 9/1972 | Ware |
| 5,486,650 A | 1/1996 | Yetter |
| 5,596,174 A | 1/1997 | Sapienza |
| 6,091,023 A | 7/2000 | O'Donnell |
| 6,362,987 B1 | 3/2002 | Yurek et al. |
| 6,395,981 B1 | 5/2002 | Ford et al. |
| 7,439,442 B2 | 10/2008 | Schutte |
| 7,499,261 B2 | 3/2009 | Hash |
| 7,952,022 B2 | 5/2011 | Rippel et al. |
| 8,049,107 B2 | 11/2011 | Dinh |
| 8,459,812 B2 | 6/2013 | Wu et al. |
| 8,739,997 B1 | 6/2014 | Ploof |
| 9,239,136 B1 | 1/2016 | Petersen et al. |
| 9,279,544 B1 | 3/2016 | Dankelmann et al. |
| 9,788,374 B1 | 10/2017 | Holleschau et al. |
| 9,951,934 B2 | 4/2018 | Buck et al. |
| 10,028,340 B2 | 7/2018 | Archer |

(Continued)

OTHER PUBLICATIONS

Elemental LED: "Switchex." Diode LED (2016): 78-79. 2016. Web.
European Patent Office, Partial Search Report for PCT/US2017/035039, dated Jul. 25, 2017.

*Primary Examiner* — Daniel D Chang
(74) *Attorney, Agent, or Firm* — United IP Counselors, LLC

(57) ABSTRACT

A power and control assembly is disclosed. An LED driver is sized and adapted to fit within a single compartment of an electrical gang box. The driver has a groove or channel, and an electrical element, such as a switch, is sized to fit within the groove.

7 Claims, 13 Drawing Sheets

(56) References Cited

U.S. PATENT DOCUMENTS

| | | |
|---|---|---|
| 10,349,476 B2 | 7/2019 | Holleschau et al. |
| 2007/0182338 A1 | 8/2007 | Shteynberg et al. |
| 2010/0052577 A1 | 3/2010 | Brownlee |
| 2010/0088901 A1 | 4/2010 | Glancey et al. |
| 2012/0139745 A1 | 6/2012 | Makwinski |
| 2012/0292991 A1 | 11/2012 | Dodal et al. |
| 2014/0312776 A1 | 10/2014 | Park et al. |
| 2015/0362164 A1* | 12/2015 | Levante ............ H05B 33/0845 315/201 |
| 2016/0006202 A1* | 1/2016 | Dupuis ................ H01R 33/90 439/540.1 |

* cited by examiner

LED DRIVER ADAPTED FOR GANG BOXES

CROSS-REFERENCE TO RELATED APPLICATIONS

This application is a continuation of U.S. patent application Ser. No. 15/693,980, filed Sep. 1, 2017, which is a divisional of U.S. patent application Ser. No. 15/360,915, filed Nov. 23, 2016, which claims priority to U.S. Provisional Patent Application No. 62/344,219, filed Jun. 1, 2016, and to U.S. Provisional Patent Application No. 62/411,166, filed Oct. 21, 2016. The contents of all of those applications are incorporated by reference in their entireties.

BACKGROUND OF THE INVENTION

1. Field of the Invention

In general, the invention relates to drivers for lighting, and in particular, to drivers for light-emitting diode (LED) light fixtures.

2. Description of Related Art

Light fixtures that use light-emitting diodes (LEDs) have become particularly popular in both residential and commercial lighting applications for a variety of reasons, including their relatively high efficiency and adaptability to a variety of different applications. While LED light fixtures are available in various types and with various power requirements, a fair number of the LED light fixtures currently on the market operate at low voltage using direct current (DC) power. The definition of "low voltage" varies depending on the authority one consults, but it generally refers to voltages under about 50V.

Low voltage DC poses a problem for fixture designers and for the carpenters and electricians who install the fixtures: the commercial and residential power grid operates at a much higher voltage, typically 110-240 volts, and uses alternating current (AC) power. Some standard voltages, particularly for industrial applications, may be higher still. Thus, in order to function in a residential or commercial installation, an LED fixture, e.g., operating at 24 VDC, will require a transformer-rectifier to convert the higher-voltage AC power to 24 VDC. That transformer-rectifier is together referred to as a "power supply," or a "driver." Even LEDs designed to operate at higher-voltage DC, e.g., 120V, typically need at least drive circuits and a rectifier, and to drive LEDs that have additional features (e.g., multi-color capability, selectable color temperature, etc.), the driver may need additional capabilities to produce power and control signals for those features as well. Of course, a driver is one more thing that a builder or electrician must find space to place, often within a wall or in another location that is hidden and difficult to access.

As LEDs have become more common and accepted in residential and commercial applications, consumers have sought to do with LEDs the same things that they are able to do with traditional incandescent lighting. Dimming—the ability to lower the light output of a lamp—is one of those things. While LEDs are inherently dimmable, legacy dimmers, intended for incandescent lighting operating on high-voltage AC power, are often not compatible with LEDs.

There are a number of dimmers that are designed to work with LEDs. For example, Elemental LED, Inc. of Emeryville, Calif. sells a combined, integrated driver and dimmer switch under the brand name SWITCHEX®. The SWITCHEX® driver-dimmer switch is configured to fit within a standard electrical single gang box (i.e., a standard electrical junction box configured to hold a single light switch). While the SWITCHEX® driver-dimmer switch is innovative and its form factor gives it compatibility with standard household and commercial lighting circuits without having to place a separate driver, the SWITCHEX® does have some disadvantages.

For one, the SWITCHEX® driver-dimmer switch is limited in the amount of power it can handle. Because of applicable standards for Class 2 electrical appliances, the SWITCHEX® driver can provide only 60 W (at 12 V) or 100 W (at 24 V) of power, whereas traditional dimmers and other electrical elements for incandescent lighting may be rated for up to 600 W of power.

Additionally, this particular driver-dimmer switch is currently manufactured in a limited number of colors and with a limited number of switch types and other options, and the aesthetic features of a switch can matter a great deal. Simply put, most people want all of their switches and related hardware to have a similar appearance. However, the consumer market for electrical switches, dimmers, and other common elements is controlled by only a few companies, and some switches and switch styles are protected by various intellectual property rights. Thus, in some cases, even if making a driver-dimmer switch in a particular style to match other existing fixtures would be possible or practical, it would be impermissible.

Beyond aesthetics, dimmer switches can be expensive pieces of hardware, and in any given home or commercial setting, there may be quite a few of them. Thus, for reasons of cost, convenience, or aesthetic fit, many consumers might prefer to keep their existing, legacy dimmer switches, and many installers prefer to buy the simplest components that are compatible with the greatest number of products.

SUMMARY OF THE INVENTION

One aspect of the invention relates to a system for using LED drivers with traditional alternating current (AC) dimmers and other conventional circuit elements. In one embodiment, an LED driver has a form that fits within a standard electrical junction box and it and a dimmer are installed adjacent one another in a two-gang electrical junction box. The LED driver has an input that, typically, receives alternating current (AC) power and an output that provides direct current (DC) power, usually at a lower voltage. The dimmer switch receives AC power at a first voltage or current level, and outputs AC power at a second voltage or current level. The output of the dimmer switch is connected to the input of the LED driver. Thus, a legacy AC dimmer can be used easily with an LED driver without having to find a separate space in which to install the driver.

Another aspect of the invention relates to methods of connecting the LED driver with fascial elements. In some embodiments according to this aspect of the invention, the fascial elements are nonfunctional or decorative elements that are placed over or attached to the LED driver to fill space and provide a suitable appearance to the assembly, so that the gang box can be fit with a standard cover. These fascial elements may include nonfunctional switches and blank plates. In other embodiments according to this aspect of the invention, the fascial elements may be functional mechanical, electrical, or electromechanical switches and controls that are connected to the LED driver to control it or to control the circuit at large. A face plate including a mechanical switch may be sized and adapted to be connected mechanically to the cover plate of the LED driver, e.g., with mechanical connectors such as cantilevered snap-fit projections. A switch carried by the face plate may mechanically trigger a button on the cover plate of the LED driver. For face plates with electrical controls, in addition to a mechanical connection, signal between the face plate and the LED driver may be carried by, e.g., rigid connectors mounted directly to printed circuit boards (PCB), a wire harness with appropriate connectors, or a ribbon cable with appropriate connectors.

Yet another aspect of the invention relates to structures and methods for partitioning high voltage and low voltage elements of a driver/dimmer circuit. In embodiments according to this aspect of the invention, high and low voltage connections are spaced apart on the body of an LED driver. A partition is inserted between the high and low voltage connections. In some embodiments, the partition may be planar, while in other embodiments, the partition may extend both vertically and horizontally. The partition may include knock-outs to pass signals from one compartment to others, and in some cases, the partition may be frangible or include break-lines to alter its size in the field. Depending on the embodiment, the partition may be carried either by the LED driver or by a junction box into which the LED driver is to be inserted.

Other aspects, features, and advantages of the invention will be set forth in the description that follows.

BRIEF DESCRIPTION OF THE DRAWING FIGURES

The invention will be described with respect to the following drawing figures, in which like numerals represent like features throughout the invention, and in which.

DETAILED DESCRIPTION

Figure 1:
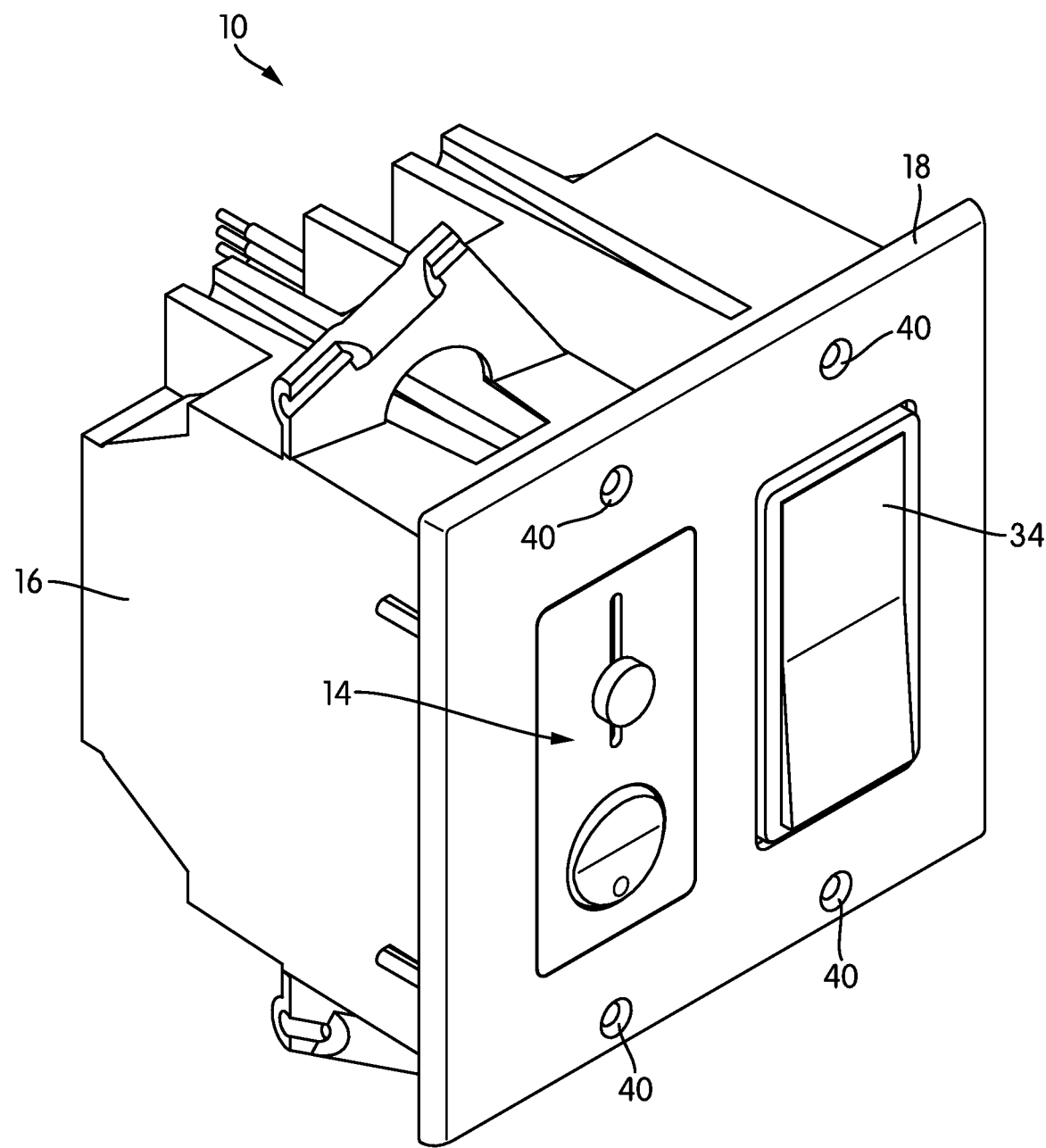
FIG. 1 is a perspective view of a two-gang box with installed dimmer and driver components.
Figure 2:
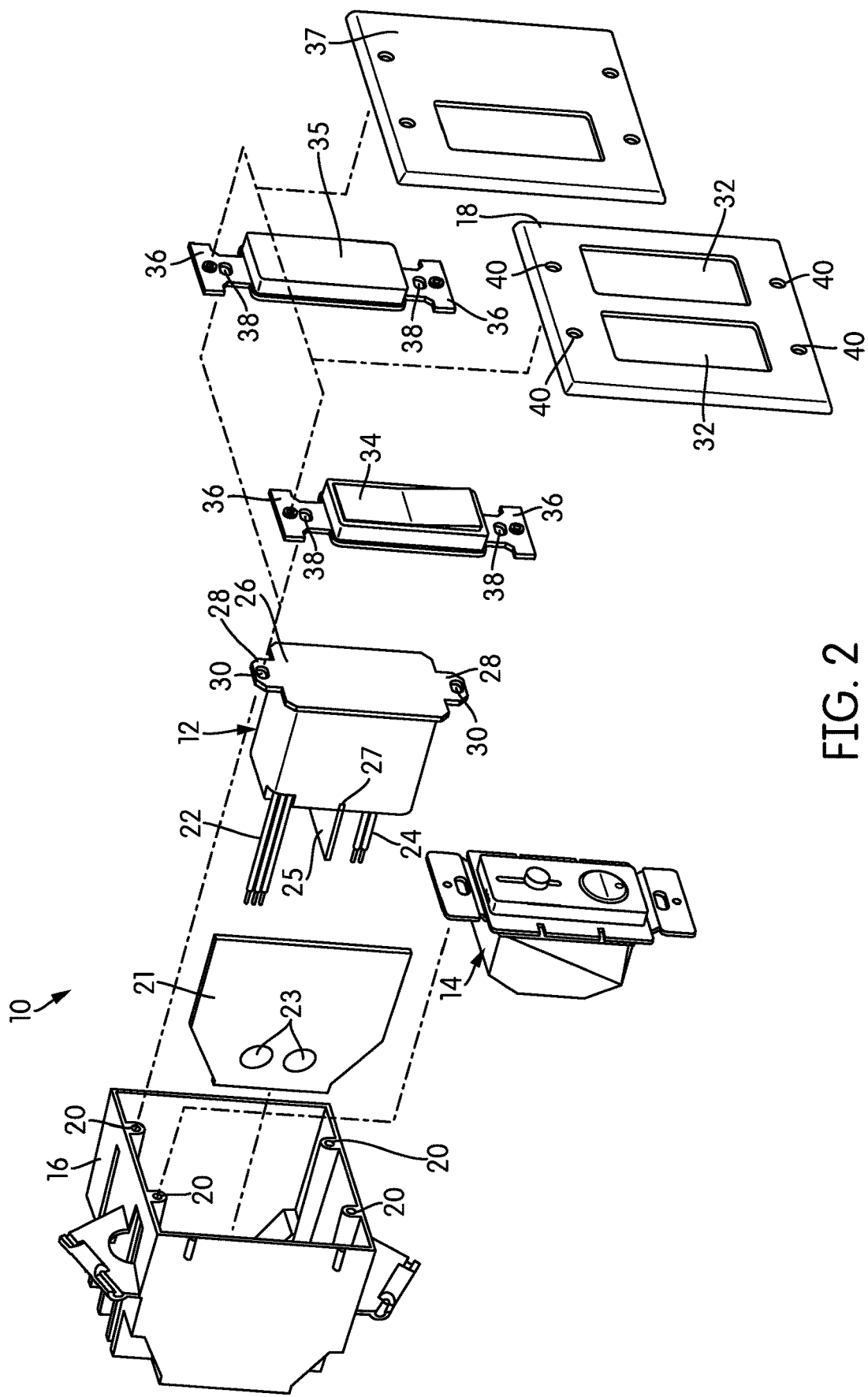
FIG. 2 is an exploded perspective view of the two-gang box of FIG. 1, illustrating the components installed within it in more detail.

FIG. 1 is a perspective view of a gang box assembly, generally indicated at 10, that houses an LED driver 12 and a conventional dimmer 14. FIG. 2 is an exploded perspective view of the assembly 10. As will be described in more detail below, the dimmer 14 is typically an alternating current (AC) phase-cut dimmer. The LED driver 12 is electrically connected to the dimmer 14 and receives its output power signal. The LED driver 12 then converts that signal to, e.g., a direct current (DC) signal that provides for an appropriate light intensity for the LEDs that it powers.

The gang box 16 itself is a receptacle in which electrical connections can be made and components can be installed. It would typically be made of a plastic or metal, and in a conventional residential or commercial installation, would be attached with nails, screws, or other conventional fasteners, for example, to the interior framing of the house. Depending on the installation, insulation may be installed around the two-gang box 16, and a rough opening made in the plaster or drywall overtop it, such that the components are accessible at the surface of the resulting wall. A decorative face plate 18 is installed as a top layer and conceals the opening in the plaster or drywall as well as the mounting portions of the other pieces.

The gang box 16 has two open compartments for the installation of components, hence its name. While a two-gang box 16 is shown in FIGS. 1 and 2, embodiments of the invention may use any sort of gang box, and gang boxes with up to five or six different compartments are common. (Gang boxes are also frequently referred to by the number of standard compartments they have, i.e., a one-gang box, a two-gang box, etc.) The two compartments of the two-gang box 16 are demarcated by fastening structures 20, centered at the top and bottom of each compartment, that are adapted to accept fasteners, like screws, to secure the components 12, 14.

In the gang-box assembly 10, the dimmer 14 is a conventional AC dimmer, and may be of any type or features. Typically, the dimmer 14 would be a phase cut type of dimmer, and may be, for example, a magnetic low voltage (MLV) or electronic low voltage (ELV) dimmer. The internal workings of the dimmer 14 are not critical to the invention, although it is assumed in parts of this description that the dimmer 14 will output an AC voltage.

Installed in the other compartment of the two-gang box 16 is the LED driver 12. The LED driver 12 is a fully enclosed element that is sized to be inserted into a compartment of a standard gang box, like the two-gang box 16, to provide power and control for a set of LED light engines. The LED light engines in question may be linear in form, e.g., the strip or tape light disclosed in U.S. Pat. No. 9,239,136, the contents of which are incorporated by reference in their entirety, or they may be in some other form, e.g., a group of LEDs packaged in the form of a standard, type A lightbulb.

Generally speaking, the dimmer 14 receives AC power at some voltage and current level from the dimmer 14 and generates an output power signal for the LEDs it controls. The AC power may be at standard household or commercial voltages (e.g., 110-240 VAC; 277 VAC), or it may be a lower voltage. (If the dimmer is a low voltage dimmer, either MLV or ELV, the driver 12 would typically be adapted to receive low voltage AC.) The power received by the LED driver 12 may be phase-cut or otherwise modified by the dimmer 14 and, as was noted briefly above, the LED driver 12 converts that power signal into a signal useable by the LEDs. Suitable outputs for the LED driver 12 include, for example, a steady DC voltage; a pulse-width modulated (PWM) switching output (which is typically a square wave); a constant current output; rectified sinusoidal or offset-sinusoidal waves; triangular, sawtooth, and complex waveforms; or a signal comprised of superposed or "stacked" individual components—such as a combination of a nonzero DC voltage and a PWM signal, which can be useful over certain portions of the dimming range to provide better performance. The output of the LED driver 12 can also switch between types of output signals depending upon where in a dimming range it is. For example, over one section of a dimming range, a steady DC voltage may provide better dimming performance, whereas over another section, a PWM signal may provide better performance.

At its rear, the LED driver 12 may include a high-voltage input adapted, for example, to accept 110-240 VAC, depending on the output type of the dimmer 14. The LED driver 12 also includes a low voltage output 24 that, for example, may output 0-50 VDC, depending on the needs of the LED lighting which it is to power and control. In other embodiments, the LED lighting may be adapted to accept high-voltage DC, in which case, the LED driver 12 would be adapted to output high-voltage DC. Similarly, if the dimmer 14 is adapted to output low-voltage AC power (e.g., 12 or 24 VAC), the LED driver 12 would be similarly adapted to receive that power. The input 22 and output 24 of the illustrated embodiment are both groups of wires.

In some embodiments, electrical codes and regulations may require that the compartments of the two-gang box 16 be separated by physical walls, so that there is a physical separation between the low-voltage component (i.e., the LED driver 12) and the high-voltage component (i.e., the dimmer 14), or between low voltage and high voltage sides of a component. Thus, as shown in the exploded view of FIG. 2, a vertical divider 21 is placed in the gang box 16. The divider 21 has two punch-outs 23 to pass wiring from the dimmer 14 to the LED driver 12. Similarly, the LED driver 12 has a horizontal divider 25 between its input 22 and output 24. The horizontal divider 25 fits into a horizontal slot 27 at the rear of the LED driver 12.

The LED driver 12 has a blank, low-profile front plate 26, e.g., made of a metal or plastic. The front plate 26 has upper and lower flanges 28, each with an opening 30 sized and positioned to allow a screw or other fastener to secure the LED driver 12 into the fastening structures 20 within the two-gang box 16.

There are many options for using the space overtop the LED driver 12, and several of those options are shown in the view of FIG. 2. One option is the arrangement of FIG. 1—a switch 34 and a decorative faceplate 18 with two openings 32, one for each compartment in the two-gang box 16. The switch 34 has upper and lower flanges 36 with first openings 38 that align with the openings 28 of the LED driver 12 and second openings 40, spaced slightly more outboard, that align with the openings 40 in the faceplate 18.

In some embodiments, the switch 34 may simply be a dummy, i.e., present to fill a hole or present a certain appearance to the end user, but electrically unconnected to anything. This allows the switch 34 to be chosen so that it matches a desired aesthetic, and manufacturing switches 34, or other fascia, with desired aesthetic appearances would generally be easier and less expensive than manufacturing the entire LED driver 12 with a particular appearance. Of course, instead of securing separately, the switch 34 may have structure that allows it to slide onto or otherwise attach to the front plate 26 of the LED driver 12.

Of course, the element placed over the LED driver 12 need not be a switch—functional or not. As shown in FIG. 2, instead of a switch 34, a fixed, decorative "blank" fascial element 35 may be used. If no switch 34 or blank element 35 is desired a decorative faceplate 37 may be used that has no opening over the compartment in which the LED driver 12 is housed—it may simply be blank.

In the simplest embodiments, the LED driver 12 may have no external controls—the input 22 and output 24 may be sufficient, and when the driver 12 takes an input AC voltage signal, it outputs a corresponding DC voltage signal. However, that need not be the case in all embodiments. For example, the LED driver 12 may include an indicator light giving its status (e.g., power on/power off/error), and the switch 34 or other fascial feature inserted over the LED driver 12, like the switch 34 or blank 34, may include a window or translucent area through which that indicator light can show. Alternately, the switch 34 or blank 35 may include an indicator light that is electrically connected to the LED driver 12, as will be described in more detail below.

In addition, while not shown in the illustrated embodiment, the LED driver 12 may have some external controls. For example, the LED driver 12 may include an adjustable potentiometer to control trim (i.e., the dimming range). It may also include a control or controls to increase or decrease output voltage and to adjust output frequency. These controls may be accessible on the front plate 26 or sides of the LED driver 12, and would generally be designed to be adjusted by the installer, rather than by the end user.

Thus, on the most basic level, the assembly 10 overcomes the limitations of integrated driver-power supply-switches like the SWITCHEX® described above—it allows the installer or end user to have an LED driver 12 that fits within a standard electrical gang box and also allows the installer or end user to select a dimmer with a look and other fascial features that fit the aesthetic of the room in which the elements are installed.

However, the assembly 10 and other such assemblies according to embodiments of the invention have other advantages and may perform other functions as well. In some embodiments, for example, instead of being a mechanical dummy, the switch 34, or another type of control put in its place, could be used for switching or control purposes. For example, the switch 34 could be used as a "zone controller" to allow the user to dim different sections of LED lighting differently. In other cases, the switch 34 may be wired to control something else. If the switch 34 is adapted to provide a control or switching function, it would typically have wires or other electrical connectors.

Figure 3:
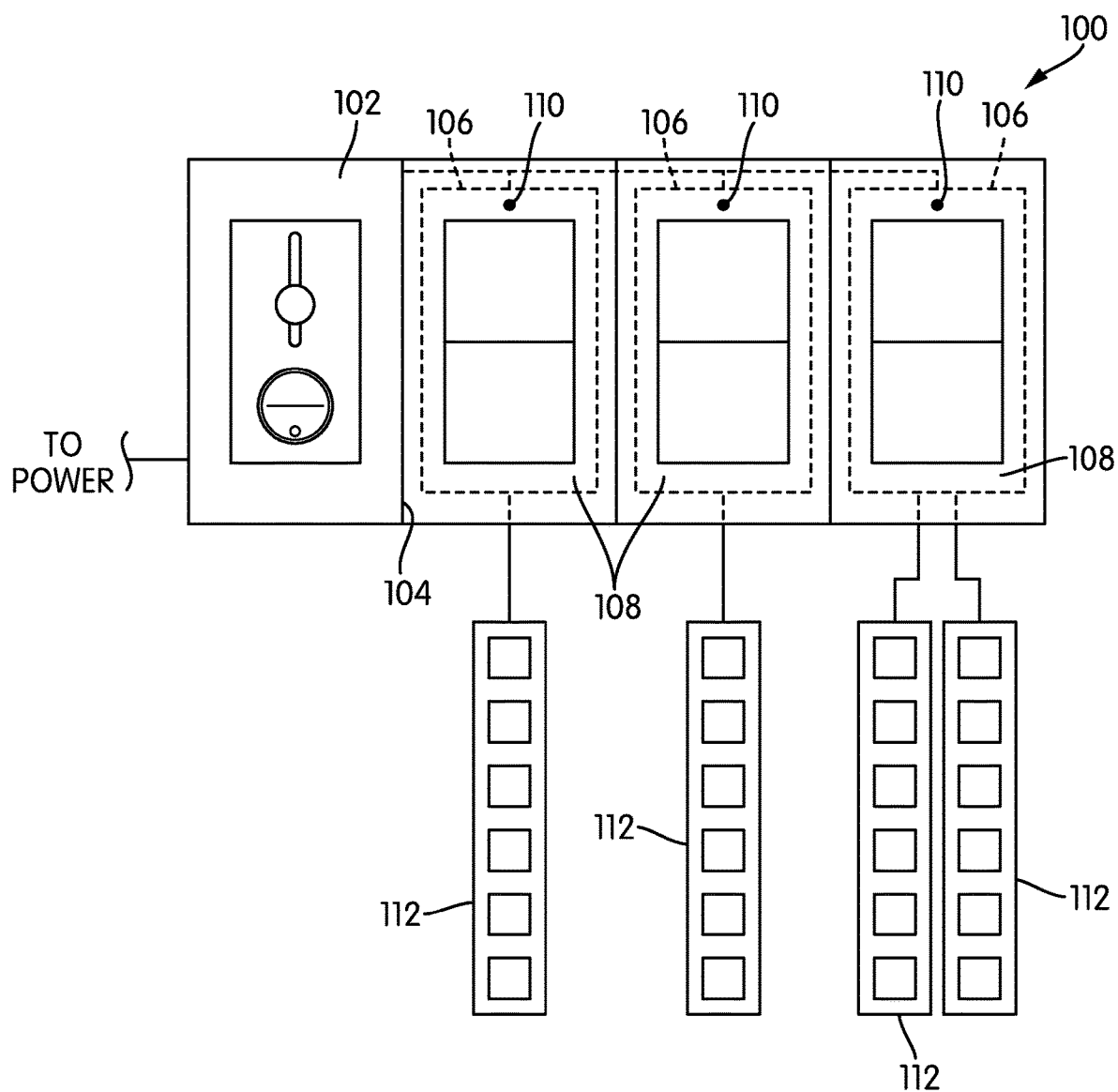
FIG. 3 is a schematic diagram of a four-gang box assembly according to another embodiment of the invention.

As one example, FIG. 3 is a schematic illustration of a four-gang box assembly 100 according to another embodiment of the invention. In the four-gang box assembly 100, a conventional AC dimmer 102 is installed in one compartment. The conventional AC dimmer 102 is connected to AC power, and a divider 104 in the gang box assembly 100 may separate the high voltage compartment occupied by the dimmer 102 from the other compartments. Each of the other three compartments includes an LED driver 106, and in the illustrated embodiment, each LED driver 106 is wired to receive the output power signal from the dimmer 102. Each LED driver 106 is fronted by a switch 108. However, in contrast to the switch 34 described above, the switches 108 are functional, and are connected to their respective LED drivers 106 to convey an on-off signal. The switches 108 also have some of the features described above—in particular, each has an indicator light 110, typically a single-color or multi-color LED, that indicates power and status for that driver 106. The indicator light 110 may be implemented either as an LED included in the switch 108 or as a window in the switch 108 that reveals an LED on the driver 106.

As connected in the view of FIG. 3, the active switches 108 provide a type of zone control. The dimmer 102 provides an output voltage or current level or signal, and the three drivers 106 dim their respective fixtures 112 in accordance with that signal. However, the user can shut any one of the "zones" off by turning off the switch 108 associated with one of the drivers 106. (If the switches are nonfunctional switches 34, the fixtures 112 would still be controlled by the dimmer 102, but the user would not be able to switch them off individually.) In FIG. 3, the fixtures 112 may be assumed to be strip lights, but any type of LED fixture, or any other element that requires the type of power output by the drivers 106 may be used.

As those of skill in the art will appreciate, the typical paradigm with gang boxes and electrical connections is that one switch, driver, or dimmer powers and controls one electrical fixture. For example, one switch will switch one bank of lights on and off. However, gang box assemblies 10, 100 according to embodiments of the invention may break from that paradigm. In many cases, a single LED driver 12, 106 may be rated to handle far more power than is required by a single LED fixture 112. Thus, in some cases, a single LED driver 12, 106 may be used to power and drive more than one LED fixture. In the illustration of FIG. 3, the right-most driver 106 drives two fixtures 112. The outputs to those two fixtures 112 may provide the same power level, so as to drive the two fixtures 112 in the same way, or they may be independent, with each providing a different drive signal or level of power.

Of course, the illustration of FIG. 3 is but one potential wiring arrangement, and other arrangements are possible. For example, in some embodiments, only one or two of the LED drivers 106 may receive the output from the dimmer 102; the other drivers 106 will simply act as switches in that embodiment. Additionally, it should be understood that although dimmers are shown in these figures, any component that produces an AC output signal may be used in embodiments of the invention. For example, a more general home automation process controller may be included in lieu of a simple dimmer 102.

The dimmer 14, 102 and drivers 12, 106 are placed in the same gang box 16, 100 in the above-described embodiments. However, as those of skill in the art will appreciate, elements in typical lighting circuits are often separated—for example, two separate switches of different types placed on different walls may control the same lighting fixture. This sort of circuit layout may be used in embodiments of the present invention as well.

Figure 4:
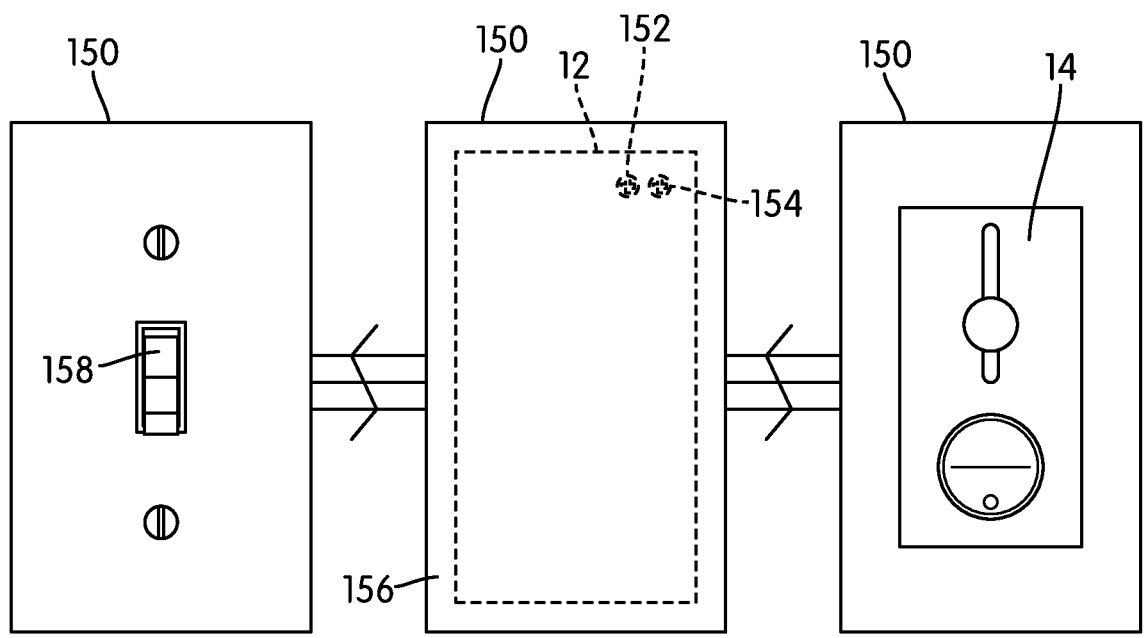
FIG. 4 is a schematic diagram of a circuit including an LED driver, an alternating current (AC) dimmer, and an AC switching element.

For example, FIG. 4 is a schematic illustration of a lighting circuit in which three one-gang boxes 150 are placed at various locations separate from one another, for example, along different walls of a room. A legacy dimmer 14 is secured within one of the one-gang boxes 150. Electrically connected to the dimmer 14 and spaced from it in its own one-gang box 150 is an LED driver 12. The LED driver 12 includes potentiometer controls for trim and voltage 152, 154. In the illustrated embodiment, the LED driver 12 fits entirely within the one-gang box 150, and the one-gang box 150 is covered by a blank face plate 156.

FIG. 4 also illustrates another possible variation. In the description above, switches are assumed to be either incorporated into the dimmer 14 or attached as face plates to the LED driver 12. However, as shown in FIG. 4, legacy AC switches 158 may also be used in embodiments of the present invention, typically as cut-offs for the dimmer 14. While FIG. 4 illustrates each component its own one-gang box 150, multiple-gang boxes may be used for some of the components.

Front-Plate Interconnection

As was described above with respect to FIG. 2, in embodiments of the invention, the LED drivers 12, 106 may be connected or coupled to any number of different styles of face plate, some functional and some nonfunctional. The connection may be purely mechanical or it may be an electrical interconnect as well.

Figure 5:
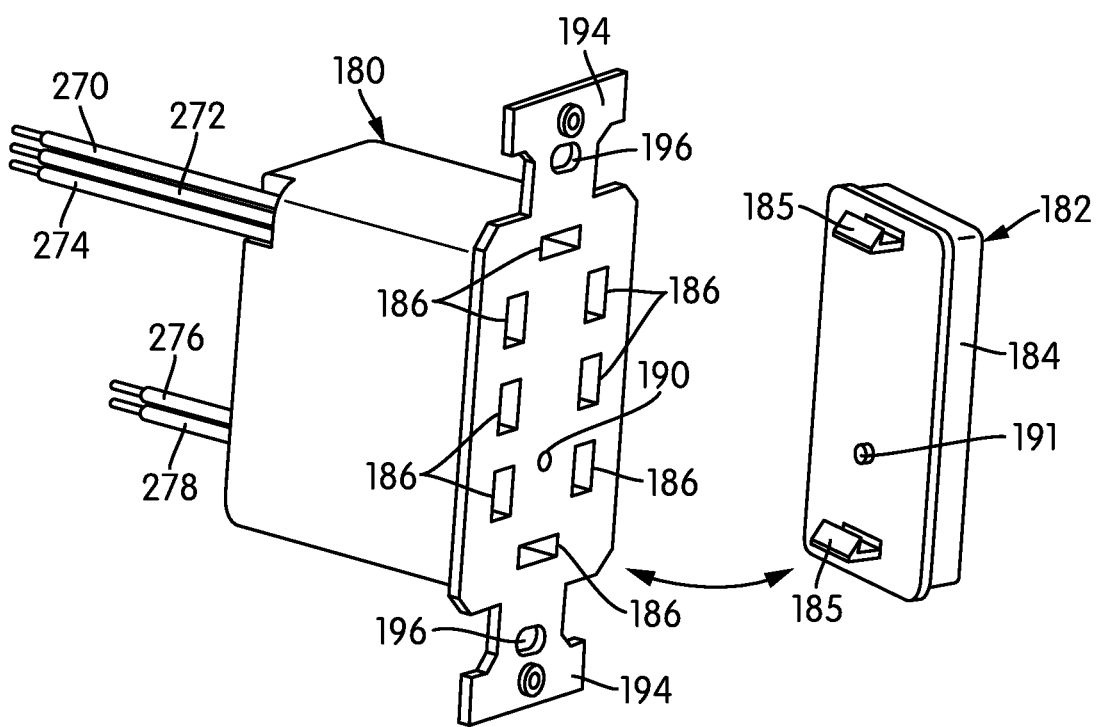
FIG. 5 is an exploded perspective view of an LED driver and an attachable face plate, illustrating the manner of connection between the two.

FIG. 5 is an exploded perspective view of an LED driver 180 and a single face plate 182 that includes a switch 184. The rear of the switch 184 includes several cantilevered snap-fit projections 185 that are designed to engage complementary openings 186 provided in the cover plate 188 of the LED driver 180. In the illustrated embodiment, the openings 186 are more numerous than the projections 185, which gives the driver 180 the ability to accept face plates with different configurations. While cantilevered snap-fit projections 185 are shown in FIG. 5, it should be understood that any cooperating, mechanically-engaging structures may be used in embodiments of the invention. For example, the cover plate 188 may have a series of threaded holes, the face plate 182 may have corresponding holes, and the two components 180, 182 may simply be secured together with machine screws or other, similar fasteners. Additionally, while the face plate 182 carries the "male" features in the illustrated embodiment and the cover plate 188 of the driver 180 carries the "female" features, that may be reversed in other embodiments.

The connection shown in FIG. 5 may be used purely for attachment, i.e., to make the LED driver 180 and the face plate 182 into a single, integral unit. However, in some cases, a switching element or another type of mechanical control carried by the face plate 182 may be used to control or direct the LED driver 180 using only a mechanical interconnect or linkage. As shown in FIG. 5, the cover plate 188 of the driver 180 may expose a button 190. The switch 184 carried by the face plate 182 may have a rearward projection 191 that is arranged to actuate the button 190 when the switch 184 is depressed.

As is also shown in FIG. 5, the cover plate 188 extends into upper and lower flanges 194 that include openings 196 for fasteners, like screws or nails. The flanges 194 are optional components that allow the driver 180 to be secured to drywall and other associated structures.

In many embodiments, it will be advantageous if the driver 180 and the face plate 182 are rigidly connected together to form a unitary whole. A rigid connection between driver 180 and face plate 182 would allow the assembly 180, 182 to be mounted in a gang box just as a conventional AC switch or dimmer is mounted. However, in some embodiments, the driver and face plate may have a more flexible connection.

Figure 6:
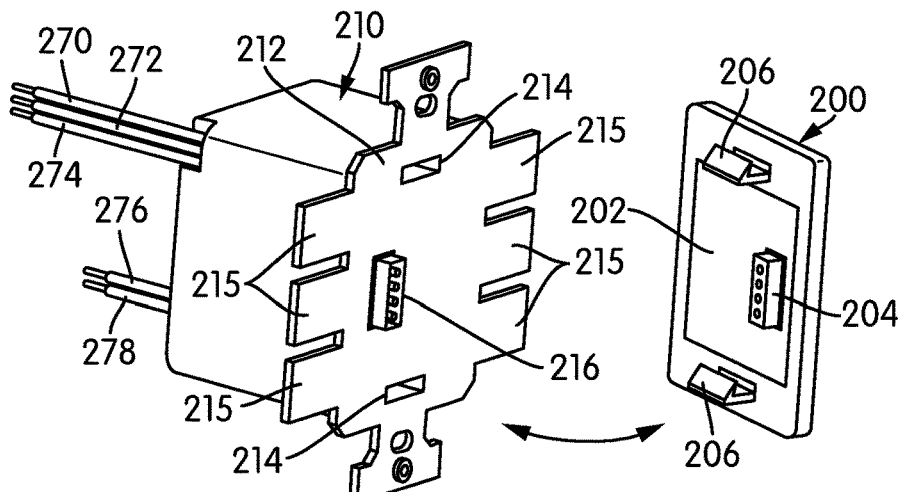
FIGS. 6-8 are exploded perspective views illustrating various ways of electrically connecting an LED driver and an attachable face plate.
Figure 7:
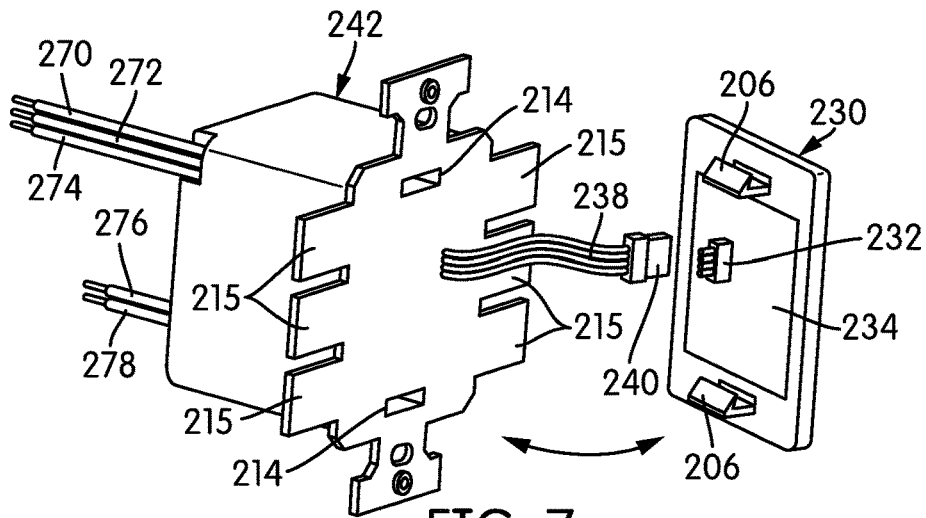
Figure 8:
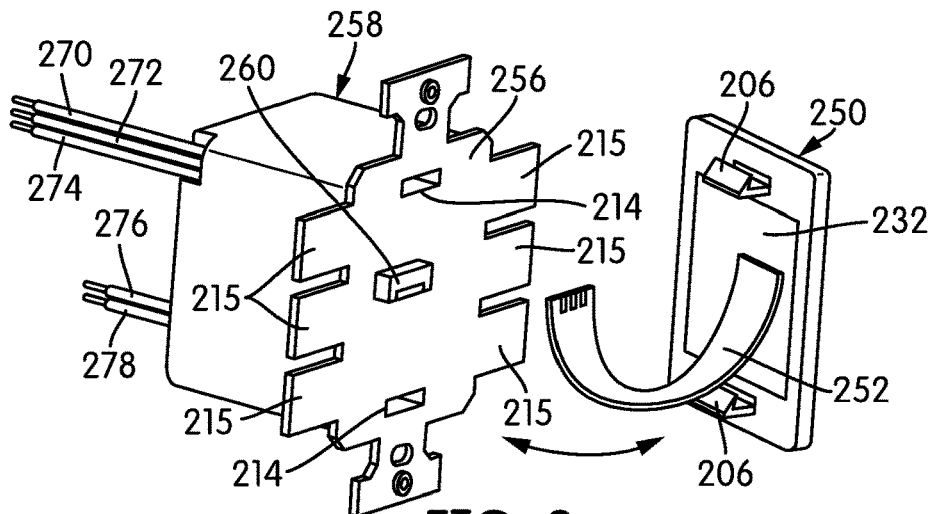

FIGS. 6-8 are exploded perspective views illustrating other embodiments of LED drivers and face plates with different forms of electrical interconnection. In the view of FIG. 6, the face plate 200 has a printed circuit board (PCB) 202 that includes circuitry for the control elements of the face plate 200. These control elements may be, e.g., a switch, a timer, a color controller, a touch screen, etc. Mounted on the PCB 202, by surface mount or other technique, is an electrical connector 204, which extends rearwardly. The face plate 200 also includes mechanical engaging elements, such as cantilevered snap-fit connectors 206. The driver 210 has a cover plate 212 with openings 214 for the mechanical connectors 206 to engage, as well as a complementary electrical connector 216. The precise type of the electrical connector 216 is not critical, although in this particular illustrated embodiment, it is helpful if the electrical connector 216 fosters a rigid connection between the driver 210 and the cover plate 212. For example, another similar technique would involve using so-called "pin header connectors." In this arrangement, one PCB has bare pins protruding and the other PCB has receptacles for the pins.

In FIG. 7, the face plate 230 has a connector 232 mounted on its PCB 234. A wire harness 238 capped with a complementary connector 240 extends from the cover plate 236 of the corresponding LED driver 242. The face plate 230 also carries mechanical connectors 206, again in the form of cantilevered snap-fit projections, although in some embodiments, these may be omitted.

In FIG. 8, the face plate 250 has a ribbon cable and connector 252 mounted on its PCB 254. The cover plate 256 of the corresponding LED driver 258 carries the corresponding connector 260 for the ribbon cable and connector. FIGS. 6-8, of course, are only three examples of the types of mechanical and electrical interconnections that can be used. As with other features, which of the components carries the "male" structures and which carries the "female" structures may vary from embodiment to embodiment. In addition to the features above, each of the drivers 210, 242, 258 in FIGS. 6-8 includes a cover plate 212 that has side flanges 215 that may make it easier to manipulate the driver 210, 242, 258 and may prevent the driver 210, 242, 258 from sinking too far back into a gang box.

Of course, not all face plates need carry control elements, like switches. Some face plates may instead carry LEDs to indicate the status of the driver 210, 242, 258 (e.g., on/off, dimming level) or, in other cases, display panels, such as LCD display panels.

As can be seen in each of FIGS. 6-8, the LED driver 210, 242, 258 carries standard wires for AC input and output. Typically, these include hot, neutral, and ground wires 270, 272, 274. As shown, each LED driver 210, 242, 258 also includes positive and ground wires 276, 278 for DC voltage output. Depending on the particular embodiment, there may be other wires or signal-outs provided. In general, the LED drivers 12, 180, 210, 242, 258 described here may be configured to drive a wide variety of different types of LEDs including single color LEDs; two-color or adjustable color temperature LEDs (typically requiring 3 wires); red-green-blue (RGB) selectable color LEDs (typically requiring 4 wires); RGB-white and RGB-amber LEDs (typically requiring 5 wires); and LEDs that require more wires or data lines for control. In addition, the drivers 12, 180, 210, 242, 258 described here may be used to power and control any type of constant voltage or constant current fixtures.

While certain portions of this description refer to wires as the primary means for power and signal input and output, and wires are the traditional means of connection in household and commercial electrical circuits, in other embodiments, any means of carrying an electrical signal may be used. Particularly if the LEDs in question require or use multiple wires, other means of connection may be helpful. Other potential signal carriers that may be used in some embodiments include cables that use twisted pairs of wires, coaxial cables, and ribbon cables.

Figure 9:
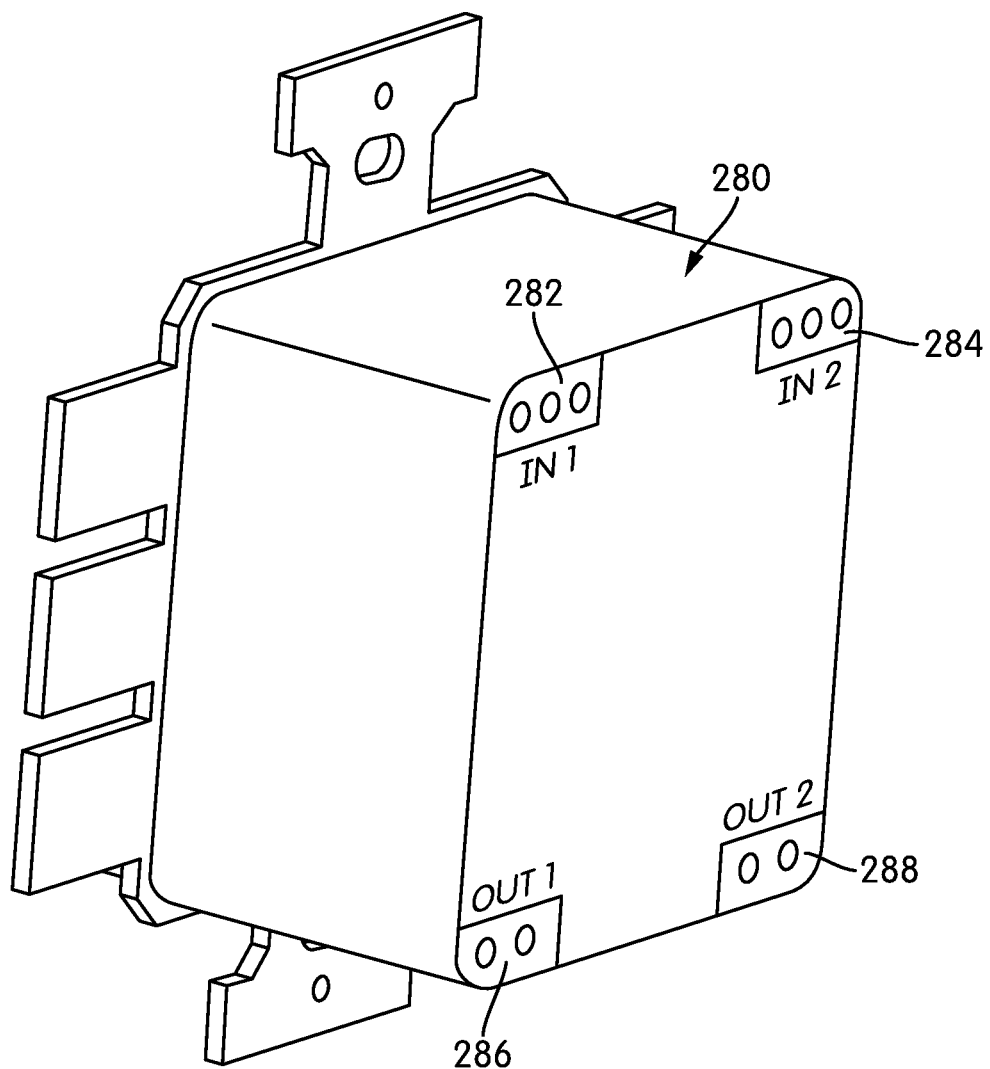
FIG. 9 is a rear perspective view of an LED driver with multiple inputs and multiple outputs.

The description above notes that in some cases, one driver may power more than one fixture, or more generally, that there need not be a one-to-one correspondence between a single driver and a single LED luminaire to be powered and controlled. FIG. 9 is a rear perspective view of a driver 280 that has two sets of inputs 282, 284, which would typically be AC inputs, and two sets of outputs 286, 288. The outputs 286, 288 may be the same voltage or different voltages (e.g., one 12 VDC output and one 24 VDC output), and they may have the same output waveform or different output waveforms, as explained above.

Figure 10:
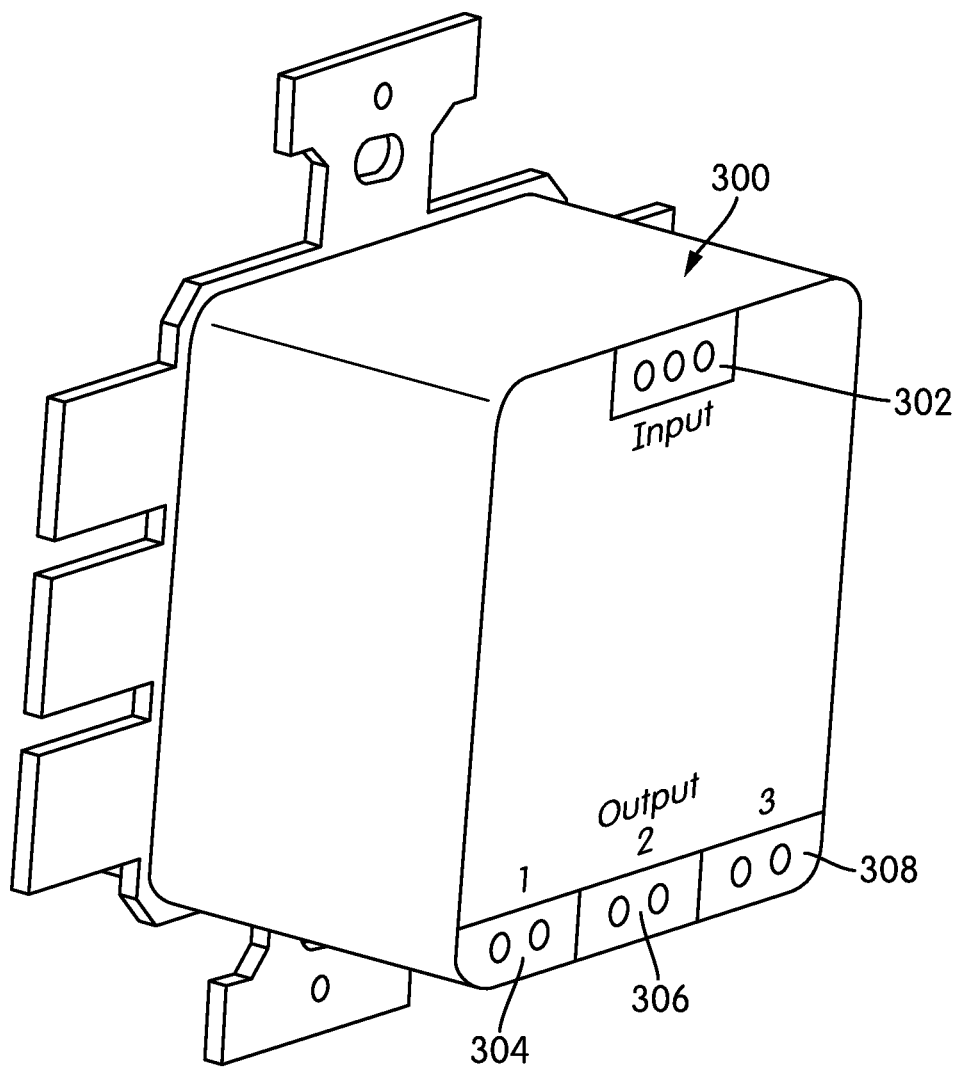
FIG. 10 is a rear perspective view of an LED driver with a single input and multiple outputs.

Similarly, FIG. 10 illustrates a driver 300 with a single input 302 and multiple outputs 304, 306, 308. As with the driver 280, the input 302 would typically be an AC input, and the outputs 304, 306, 308 may be the same or different voltages, and they may generate the same or different output waveforms.

FIGS. 9 and 10 also illustrate a feature of the drivers 280, 300 that may be used in a variety of embodiments: rather than including hardwired, permanently attached output wires, the inputs 282, 284, 302 and outputs 286, 288, 304, 306, 308 may instead comprise terminal blocks, into which wires of suitable lengths can be inserted to connect them. Screw terminals or other such electrical connections may be used. The use of terminals, rather than wires connected at the time of manufacturing, gives the installer more flexibility.

Figure 11:
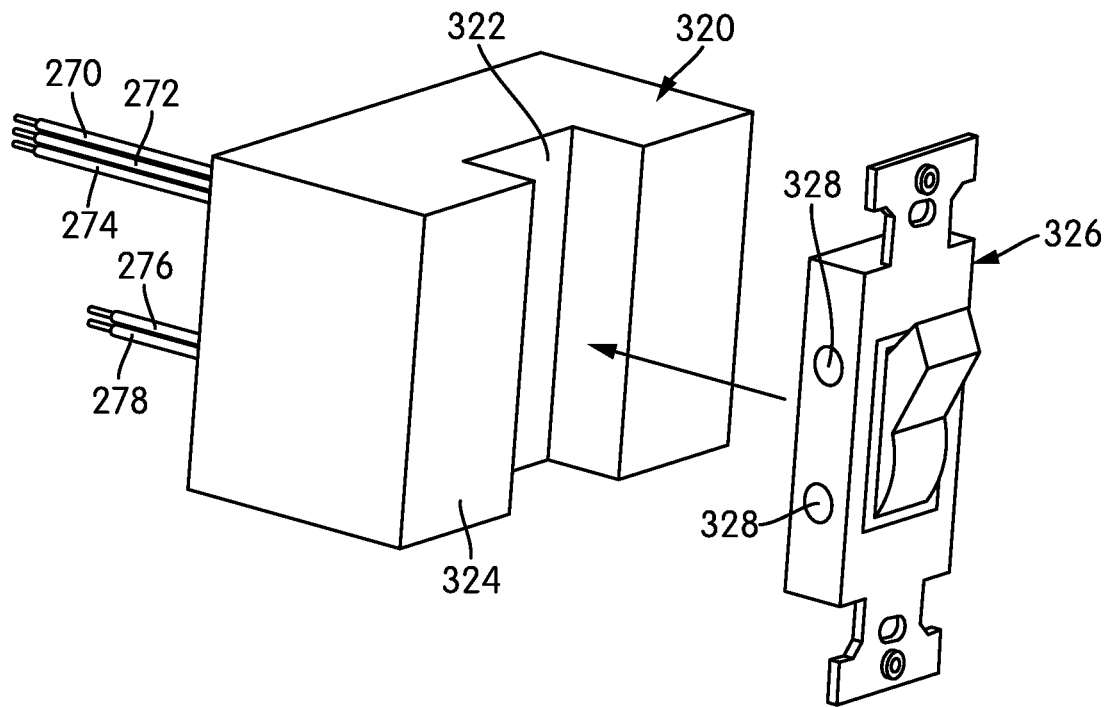
FIG. 11 is an exploded perspective view of an LED driver of a different shape accepting a switch.

In the description above and in the figures, the LED drivers 12, 180, 210, 242, 258 are generally rectilinear in shape, sometimes with truncated or rounded corners, and the appropriate face plate cover fits overtop of the driver. However, so long as it will fit in a standard electrical gang box (whether a one-gang box, a two-gang box, etc.), the precise shape of the driver is not critical. FIG. 11 is a schematic exploded perspective view of a driver 320 that, while it has generally rectilinear features, also has a deep rectangular channel 322 in the center of the front face 324. Instead of merely resting on or against the front of the driver 320, a switch 326 fits within the channel 322. Standard mechanical elements, like cantilevered snap-fit projections 206, may be used to connect the two. If a snug fit (or press fit) is desired between the switch 326 (or other element) and the driver 320, instead of a connector, ribbon cable, or other such connection means, a set of conductive contacts 328 may be provided on the side or sides of the switch 326, positioned to mate with complementary contacts on the sidewalls of the channel 322. The contacts 328 on the switch 326 or the complementary contacts on the sidewalls of the channel 322, which are not visible in the view of FIG. 11, may be spring-loaded to facilitate positive connection between the two. The driver 320 itself may be sized to fit within a one-gang box, a two-gang box, or any other standard electrical junction box. Of course, it may be advantageous if the combination 320, 326 can fit within a one-gang box.

Figure 12:
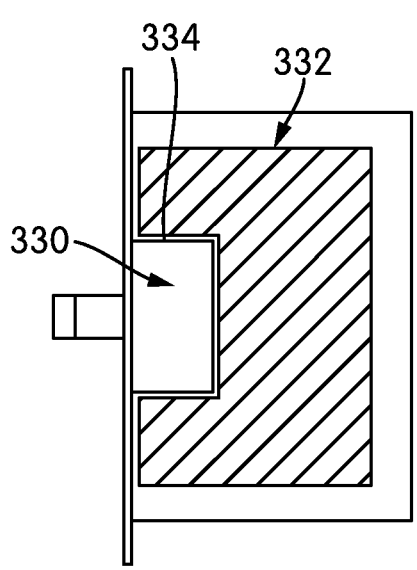
FIGS. 12 and 13 are schematic cross-sectional views illustrating the engagement of LED drivers and switching and control elements.
Figure 13:
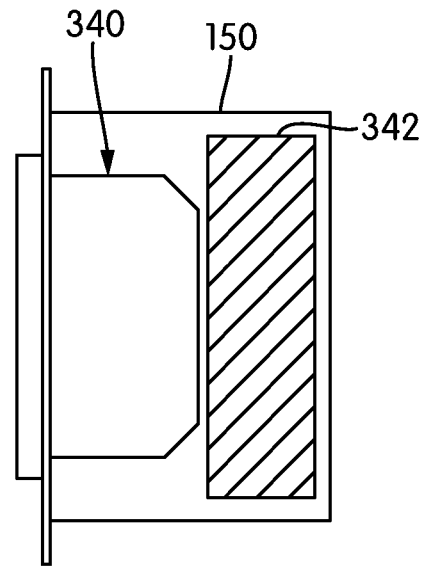

FIG. 11 is only one example of how a driver 320 and a switching or control element 326 may be shaped and configured in complementary ways. However, other configurations are possible. FIGS. 12 and 13 are schematic cross-sectional views illustrating alternate configurations. In FIG. 12, a switching element 330 is enveloped by a driver 332 that has a channel 334 or depression. In FIG. 13, a switching, control, or display element 340 has a larger extent within the junction box 150, and the driver 342 is placed in the space behind it.

Figure 14:
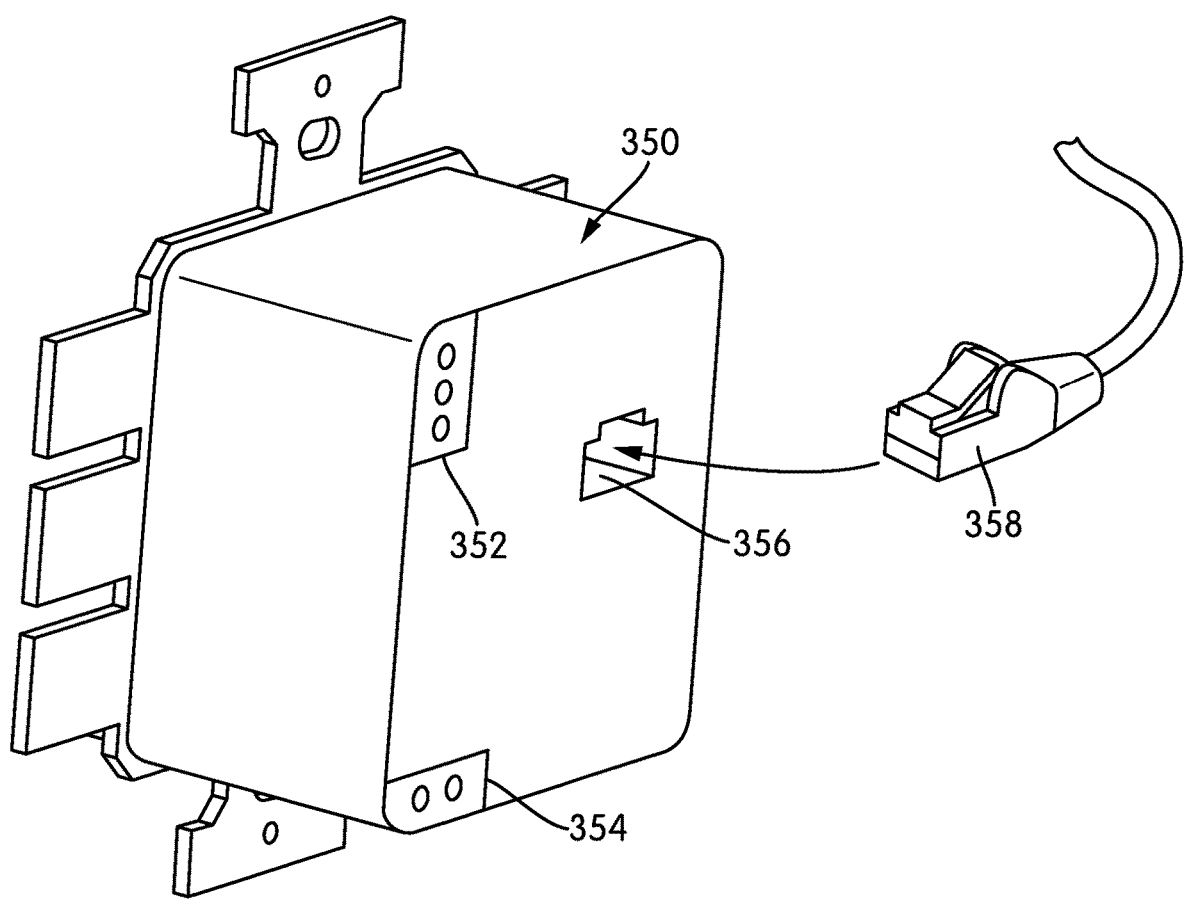
FIG. 14 is a rear perspective view of an LED driver adapted to accept an external data connection.

FIG. 14 is a rear perspective view of a driver 350 according to another embodiment of the invention. In addition to an input terminal block 352 and an output terminal block 354, the driver 350 includes a jack 356 for an Ethernet cable 358. While much of this description focuses on driving and dimming LEDs, there are a variety of scenarios in which a driver 350 may require, or create additional benefit, when connected to a local or wide-area computer network, such as the Internet. For example, the face plate connected to the driver 350 may have household automation controls that require connection to a network so that, e.g., lighting can be turned on and off by controls on the face plate or by an application running on a computer or on a computing device like a cell phone or tablet. Of course, a hard-wired connection using an Ethernet cable 358 is not the only way of connecting to a computer network. In various embodiments, the driver 350 may connect to a network by other forms of wired connection, for example, using a coaxial cable, or it may connect to a network using a number of different types of wireless networking technologies, including IEEE 802.11 a/b/g/n/ac (WiFi), IEEE 802.15.1 (Bluetooth), near-field communication, and other common wireless networking protocols and technologies.

In addition to receiving information from external sources and controlling its LEDs in accordance with that information, the LEDs may instead be used to transmit data themselves. Visible light communication (VLC) has long been known in various forms, and in recent years, various entities have explored using LEDs to transmit data. In this type of network, LEDs are driven by a high-frequency signal that is modulated to carry data. The high frequency of this modulation—typically in the gigahertz range—is invisible to the human eye, and thus, the LEDs do not appear to flicker. Modulation formats like on-off keying and variable pulse position modulation can be used to encode data, and an optical sensor can be used to receive the data. Regardless of the particular protocols used, the data jack 356 in the driver 350 may be used to accept data that is to be transmitted by the LEDs to which it is connected, and the driver 350 may also include an optical sensor or sensors and circuits to demodulate data that is received and route it to the jack 356 for outbound transmission.

In the context of this invention, if necessary or desirable for networking or other purposes, components other than standard lighting components may be included in the electrical junction boxes, with larger, multi-position boxes being used to hold the additional components.

Separation of High- and Low-Voltage Components

As was described briefly above, electrical codes or other requirements may require the physical separation of high-voltage and low-voltage elements in a household or business electrical circuit. Since LED drivers according to embodiments of the invention include both high-voltage inputs and low-voltage outputs, barriers like the barrier 21 of FIG. 2 may be included.

Figure 15:
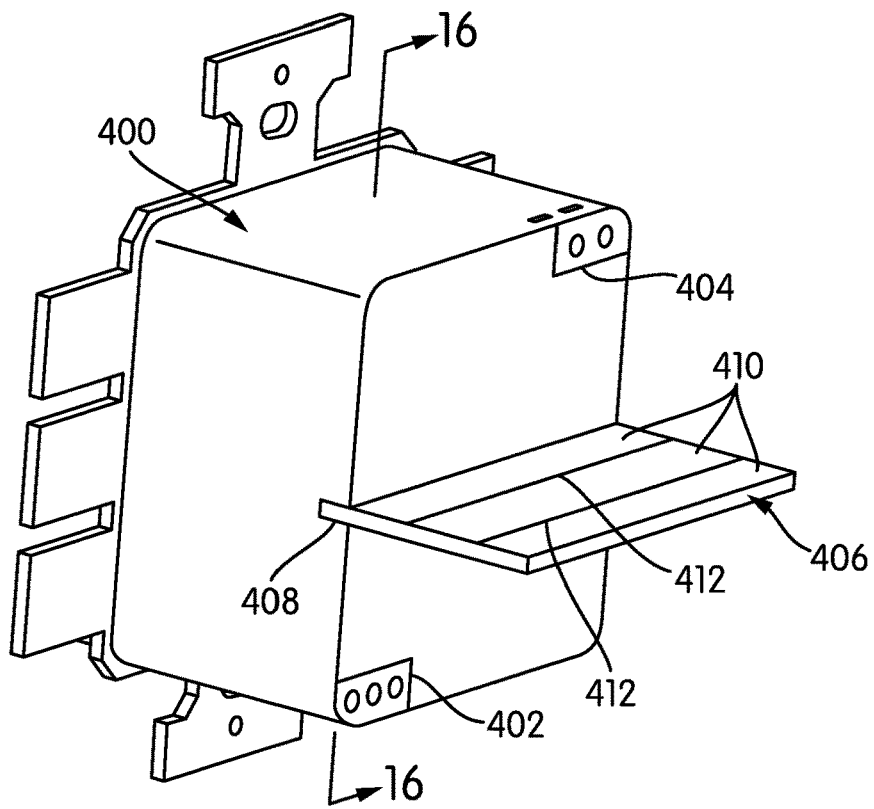
FIG. 15 is a rear perspective view of an LED driver illustrating a barrier between high voltage and low voltage sides of the driver.
Figure 16:
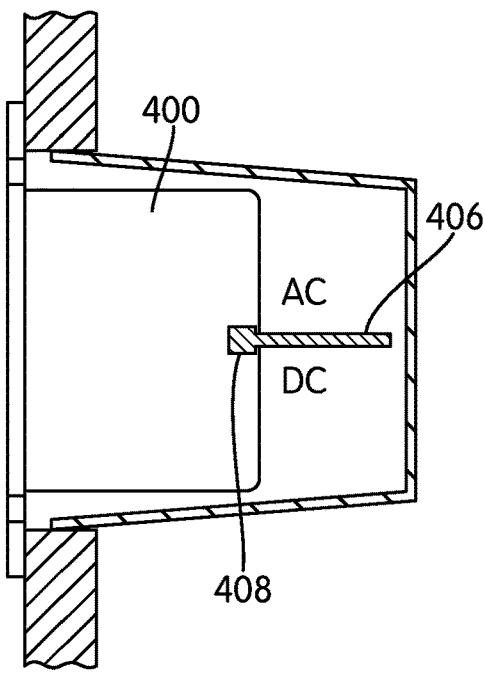
FIG. 16 is a schematic cross-sectional view taken through Line 16-16 of FIG. 15.

FIG. 15 is a rear perspective view of an LED driver 400. The driver 400 has a high-voltage AC input terminal block 402 toward its rear bottom. A low-voltage output terminal block 404 is provided in the upper right corner. A horizontal barrier 406 is seated in a horizontal groove 408 provided across the rear of the driver 400. FIG. 16, a cross-sectional view taken through Line 16-16 of FIG. 15, schematically illustrates how this would appear in a junction box—the barrier 406 projects rearwardly from the driver 400 to isolate the high voltage and low voltage sides. Another feature of the barrier 406 is shown in the view of FIG. 15: the barrier 406 has two frangible portions 410 defined by break lines 412 in the barrier 406. These frangible portions 410 can be broken off of the barrier 406 to shorten it, if necessary, at the time of installation. Of course, frangible portions 410 and break lines 412 are optional features, and may not be present in all embodiments.

Figure 17:
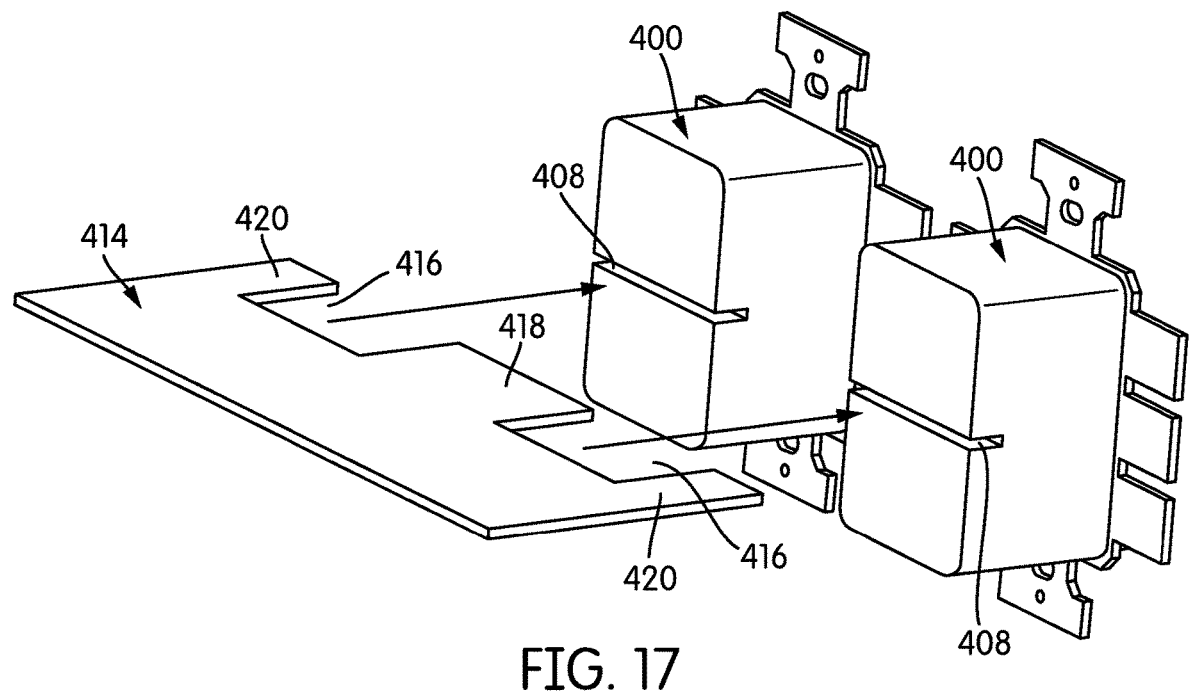
FIG. 17 is an exploded rear perspective view of two adjacent drivers of FIG. 15 with a larger, common barrier between high voltage and low-voltage sides.

As described above, there are embodiments in which multiple drivers 400 may be placed adjacent one another in a multiple-gang box. FIG. 17 is an exploded rear perspective view of two drivers 400 with rear, horizontal grooves 408. Instead of using a single barrier 406 in each of these grooves, as illustrated in FIG. 17, a larger barrier 414 is used. The barrier 414 has two C-shaped cut outs 416 that define a tongue 418 that extends between the two drivers 400 and tongues 420 that extend to the left and right sides of the drivers 400, in order to foster a more complete separation between high and low voltage.

Figure 18:
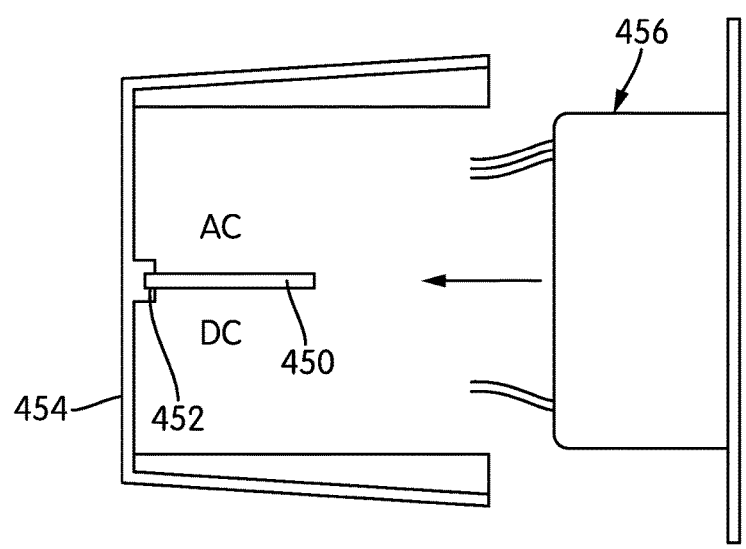
FIG. 18 is a schematic side-elevational exploded view of a gang box and driver, illustrating a high-low voltage barrier carried by the gang box.

In some embodiments, the barrier 406, 414 need not be carried by the driver 400. Instead, as shown in the schematic exploded side-elevational view of FIG. 18, a barrier 450 may be carried in a slot or groove 452 along the rear of a gang box 454. When a driver 456 is inserted into the gang box 454, the barrier 450 separates high- and low-voltage sides.

Figure 19:
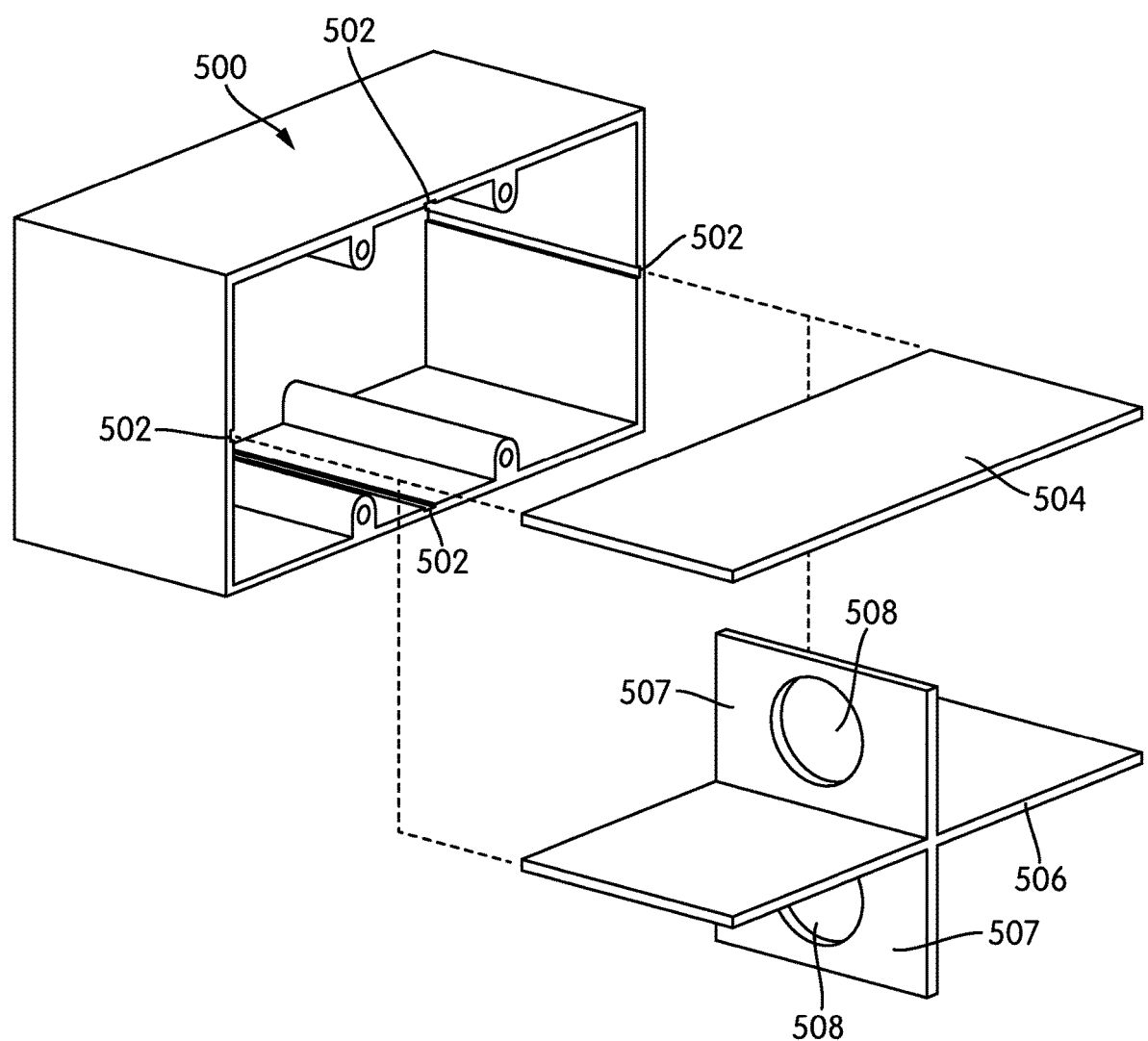
FIG. 19 is an exploded perspective view showing various types of high-low voltage barriers carried by a two-gang box.

Especially in multiple-gang boxes, barriers of different characteristics may be used. FIG. 19 is an exploded perspective view of a two-gang box 500. The two-gang box 500 has interior slots or grooves 502 located along each face, between positions along its long side and mid-way up along its vertical walls. Two options for potential barriers are shown in FIG. 19. One option is a simple horizontal barrier 504 to divide between high voltage and low voltage areas, assuming that the high voltage area is located toward the top and the low voltage area is located toward the bottom, or vice-versa. The other option shown in FIG. 19 is a cross-shaped barrier 506 that extends both horizontally and vertically, seating in all four of the grooves 502 in the two-gang box 500. The barrier 506 divides the two-gang box 500 into high-voltage and low-voltage areas, and also provides vertical barriers 507 between adjacent components. Cut-outs 508 are formed in the vertical barriers 507 in order to pass high-voltage and low-voltage wires, respectively, between adjacent components in the two-gang box 500. In some embodiments, there may be frangible portions that are broken out at the time of installation to form the cut-outs 508.

Hanging Fixtures

Most of the disclosure above focuses on the placement of drivers 12, 106 in gang boxes 16 within vertical walls. However, there are a number of situations in which it is desirable to place a gang box 16, or another kind of junction box, in a ceiling. This is useful, for example, when one wishes to use a hanging light fixture, or another element, like a ceiling fan, that requires an electrical connection. Embodiments of the invention may be adapted to hanging-fixture scenarios.

Figure 20:
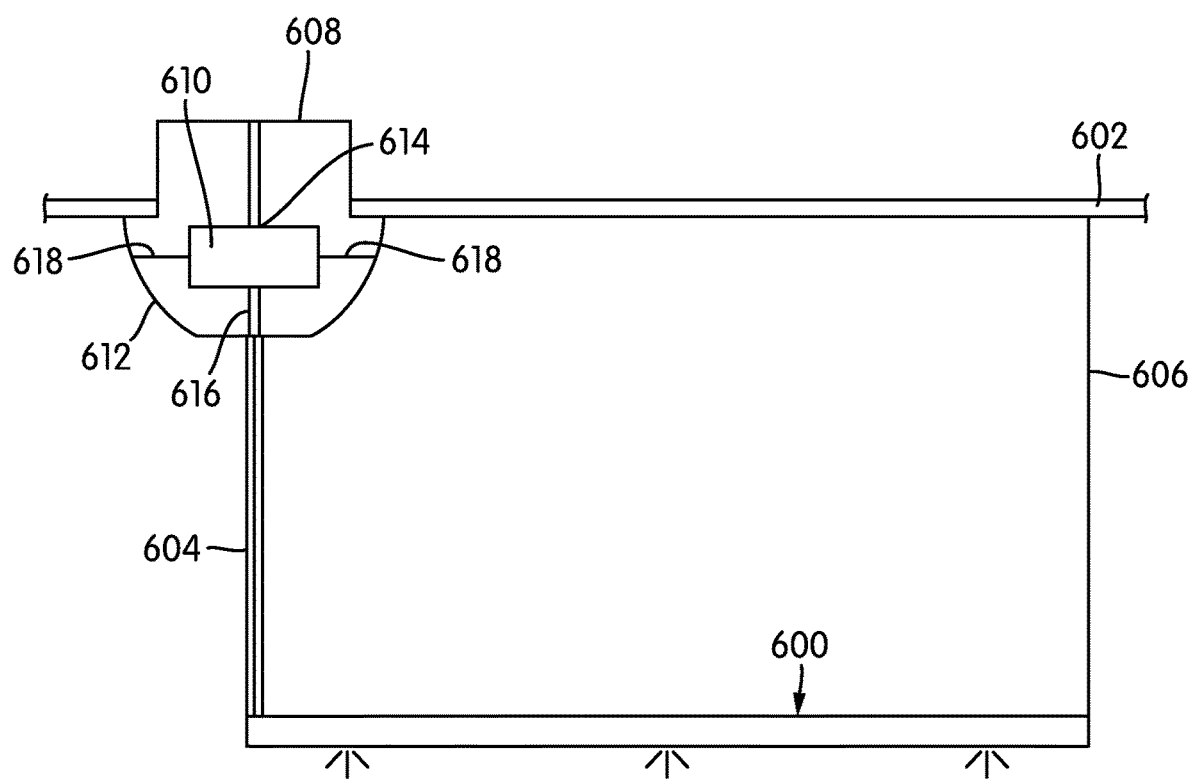
FIG. 20 is a schematic, partially sectional view illustrating the use of a driver according to the present invention with a hanging fixture.

More particularly, FIG. 20 is a schematic, partially sectional view of a hanging light fixture, generally illustrated at 600, showing its attachments. The light fixture 600 of FIG. 20 is in the form of an extrusion, although pendant lighting of various types may also be used. With respect to extrusions, U.S. Pat. No. 9,279,544, the contents of which are incorporated by reference, discloses a number of extrusions that may be used with linear LED lighting, and for purposes of this description, the light fixture 600 may be assumed to be an extrusion with linear LED lighting mounted within and, optionally, a diffuser overtop.

On or near one end, the extrusion 600 is connected to the ceiling 602 by a thin, downwardly extending conduit 604 which may be, e.g., made of a metal. On or near the other end, the extrusion 600 is supported by another means, such as a thin metal wire 606, although in other embodiments, the two mountings 604, 606 may be the same. As is typical in residential and commercial settings, a junction box 608 is mounted in the ceiling 602. The illustration of FIG. 20 assumes that only one junction box 608 is available in the area in which the light fixture 600 is to be installed; if more than one junction box 608 is available, more than one may be used.

If the junction box 608 is large enough, a driver 12, 106 may be installed in it as in other embodiments. Because the junction box 608 is in the ceiling, as in the arrangement of FIG. 4, control elements like switches and dimmers are typically located elsewhere in the electrical circuit, where they can be accessed and used more easily. However, in some cases, a switch, dimmer, or other control element that takes infrared or radio input (e.g., from a remote control or a home automation system) may be installed in the junction box 608.

In FIG. 20, a driver 610 is installed. However, the driver 610 does not fit entirely within the junction box 608. Instead, the driver 610 uses some of the space covered by the canopy 612, the usually decorative fitting that covers the junction box 608. In some cases, the driver 610 may be arranged as the other drivers described above are arranged: with high-voltage inputs and low-voltage outputs both located in the rear. However, the driver 610 of FIG. 20 is arranged somewhat differently, with high-voltage input and ground terminals on one side of the driver 610 and low-voltage output and ground 616 on the other side. The low-voltage output wires 616 travel down the conduit 604 to the light fixture 600. A partition or partitions 618 are attached between the driver 610 and the interior sides of the canopy 612 or junction box 608 to separate high voltage from low voltage.

As the above description bears out, while the high-voltage inputs for a driver according to embodiments of the invention are usually at the rear, and the low-voltage inputs are usually also at the rear, that arrangement may vary. There may be situations, like that in FIG. 20, in which it is more convenient for a driver 610 to have low-voltage outputs on the front cover plate 26. Ultimately, the inputs and outputs may be in any convenient or necessary locations.

Beyond powering lighting fixtures, a number of devices are powered or charged with low-voltage DC, and in some embodiments, the driver 610 may have a low-voltage output jack, either on its body or on a face plate that is removably attached to the driver 610, as in FIGS. 6-8. A jack, as compared with wire terminals, would allow portable fixtures and other electronic devices to be powered. If a jack is used, the jack may be of a standard type, such as a barrel connector socket or a USB or USB-C socket.

While the invention has been described with respect to various embodiments, the description is intended to be exemplary, rather than limiting. Modifications and changes may be made within the scope of the invention, which is defined by the appended claims.

What is claimed is:

1. An electrical control assembly, comprising:
    a driver having an input adapted to accept power in a first form and an output adapted to provide power in a second form that is different from the first form, the driver having
        an enclosed body that includes the input and the output, and
        a channel in a front portion of the body, the front portion of the body having a front face; and
    a modular electrical control element adapted to fit interchangeably within the channel of the driver and to connect electrically with the driver such that the front face of the body of the driver is adjacent to a front face of the electrical control element;
    wherein the driver and the electrical control element are sized to fit within a one-gang box.

2. The electrical control assembly of claim 1, wherein the input of the driver accepts high-voltage, alternating-current (AC) power, and the output provides low-voltage, direct-current (DC) power.

3. The electrical control assembly of claim 2, wherein the electrical control element provides an electrical control signal to the driver.

4. The electrical control assembly of claim 3, wherein the driver further comprises one or more electrical contacts in the channel, and the electrical control element has one or more complementary electrical contacts adapted to connect to the one or more electrical contacts in the channel.

5. The electrical control assembly of claim 2, wherein the output is connected, directly or indirectly, to low-voltage lighting.

6. The electrical control assembly of claim 2, wherein the electrical control element comprises a switch.

7. The electrical control assembly of claim 2, wherein the electrical control element comprises a dimmer.

* * * * *